(12) United States Patent
Lin et al.

(10) Patent No.: US 11,782,802 B2
(45) Date of Patent: Oct. 10, 2023

(54) METHOD, ELECTRONIC DEVICE, AND COMPUTER PROGRAM PRODUCT FOR DATA PROTECTION

(71) Applicant: EMC IP Holding Company LLC, Hopkinton, MA (US)

(72) Inventors: Chao Lin, Chengdu (CN); Yuting Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/386,961

(22) Filed: Jul. 28, 2021

(65) Prior Publication Data

US 2022/0405176 A1 Dec. 22, 2022

(30) Foreign Application Priority Data

Jun. 18, 2021 (CN) .......................... 202110679212.7

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1464* (2013.01); *G06F 11/1484* (2013.01)

(58) Field of Classification Search
CPC ............. G06F 11/1451; G06F 11/1464; G06F 11/1469; G06F 11/1484; G06F 3/0617; G06F 3/0647; G06F 3/0662
See application file for complete search history.

(56) References Cited

U.S. PATENT DOCUMENTS

| | | | |
|---|---|---|---|
| 2018/0285199 A1* | 10/2018 | Mitkar | G06F 11/2048 |
| 2021/0064262 A1* | 3/2021 | Myers | G06F 3/065 |
| 2021/0240734 A1* | 8/2021 | Shah | G06F 9/5072 |
| 2021/0271565 A1* | 9/2021 | Bhavanarushi | G06F 11/1464 |
| 2022/0229649 A1* | 7/2022 | Myers | G06F 8/63 |

* cited by examiner

*Primary Examiner* — Marc Duncan
(74) *Attorney, Agent, or Firm* — WOMBLE BOND DICKINSON (US) LLP (57) ABSTRACT

Embodiments of the present disclosure provide a method, an electronic device, and a computer program product for data protection. The method described here includes backing up an identifier of an application wrapper operating on a source platform and application data to a repository. The method further includes acquiring a container mirror image based on an identifier of a target platform and the identifier of the application wrapper that is restored from the repository, the container mirror image targeting the application wrapper operating on the target platform. The method further includes applying the application data restored from the repository to a container started from the container mirror image. With the solution of data protection of the present application, it is possible to efficiently migrate applications on a source platform to multiple different types of target platforms flexibly by backing up only application data and identifiers of application wrappers, thus improving the efficiency of data protection.

12 Claims, 5 Drawing Sheets

METHOD, ELECTRONIC DEVICE, AND COMPUTER PROGRAM PRODUCT FOR DATA PROTECTION

CROSS-REFERENCE TO RELATED APPLICATION

This patent application claims priority, under 35 U.S.C. § 119, of Chinese Patent Application No. 202110679212.7, filed Jun. 18, 2021, which is incorporated by reference in its entirety.

TECHNICAL FIELD

Embodiments of the present disclosure relate to the field of data storage, and in particular, to a method, an electronic device, and a computer program product for data protection.

BACKGROUND

Typically, data protection is for physical or pseudo-physical entities. In the mainframe era, physical volumes are backup entities. In the client terminal/server era, physical servers are backup entities. In recent years, virtual machines are backup entities. However, with the popularity of distribution systems and hybrid clouds, user data may need to be migrated between different platforms. As a result, the focus of data protection gradually shifts to applications per se operating on physical or pseudo-physical entities. In other words, solutions that can back up and restore applications between different platforms are needed.

SUMMARY OF THE INVENTION

In a first aspect of the present disclosure, a method for data protection is provided. This method includes backing up an identifier of an application wrapper operating on a source platform and application data to a repository. The method further includes acquiring a container mirror image based on an identifier of a target platform and the identifier of the application wrapper that is restored from the repository, the container mirror image targeting the application wrapper operating on the target platform. The method further includes applying the application data restored from the repository to a container started from the container mirror image.

In a second aspect of the present disclosure, an electronic device is provided. The electronic device includes a processor and a memory coupled to the processor, the memory having instructions stored therein which, when executed by the processor, cause the device to execute actions. The actions include backing up an identifier of an application wrapper operating on a source platform and application data to a repository. The actions further include acquiring a container mirror image based on an identifier of a target platform and the identifier of the application wrapper that is restored from the repository, the container mirror image targeting the application wrapper operating on the target platform. The actions further include applying the application data restored from the repository to a container started from the container mirror image.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect.

In the embodiments of the present disclosure, with the solution of data protection of the present application, it is possible to efficiently migrate applications on a source platform to multiple different types of target platforms flexibly by backing up only application data and identifiers of application wrappers, thus improving the efficiency of data protection.

The Summary of the Invention part is provided to introduce the selection of concepts in a simplified form, which will be further described in the Detailed Description below. The Summary of the Invention part is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

DETAILED DESCRIPTION

The principles of the embodiments of the present disclosure will be described below with reference to several example embodiments shown in the accompanying drawings. Although preferred embodiments of the present disclosure are illustrated in the accompanying drawings, it should be understood that these embodiments are described only to enable those skilled in the art to better understand and then implement the embodiments of the present disclosure, and are not intended to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" indicates "at least one additional embodiment." The terms "first," "second," and the like may refer to different or identical objects. Other explicit and implicit definitions may also be included below.

As mentioned above, the focus of data protection gradually shifts to applications per se operating on physical or pseudo-physical entities. At present, a number of methods for data protection have been proposed to back up and restore applications between different platforms. For example, a snapshot of an application operating on a source platform can be used as a backup of the application. However, snapshots are essentially associated with hardware or a platform. Most snapshots are implemented at the volume or logical unit number (LUN) level, and the content is subdivided into fixed blocks. Snapshots represent a mix of original blocks and changed blocks that have changed over time, but are not aligned with a file system or application. Snapshots acquire point-in-time mirror images of physical storage but are not aligned with transactions. In a public cloud, each cloud service provider implements snapshots based on its storage technology. As a result, backups acquired from snapshots will depend on hardware and the data retention methods are inconsistent across service providers. This means that moving snapshots from one public cloud provider to another is not easy (or possibly impossible).

Another proposed method backs up application data files and transaction files by applying a specific application programming interface (API). The problem with this method is that although application data is separated from an underlying application wrapper, restoring the application on a target platform requires first setting up a physical or virtual instance that matches the application wrapper, which is not easy and will consume much time.

Another method proposed is to back up application data and application wrapper data. This method not only backs up an entire physical or virtual instance but also backs up application data and transaction files. Therefore, during the restoration, it is possible to restore the physical or virtual instance first and then restore the application data to it. However, since snapshots of physical or virtual instances are closely related to hardware platforms, they need to be converted and manipulated to be used in a public cloud. Therefore, this approach is not suitable for backup to multiple target platforms. Therefore, solutions that are capable of decoupling application data from the infrastructure are needed to migrate applications across multiple platforms.

A solution is provided in the embodiments of the present disclosure. In this solution, an identifier of an application wrapper operating on a source platform and application data are backed up to a repository. In this solution, a container mirror image is acquired based on an identifier of a target platform and the identifier of the application wrapper that is restored from the repository, the container mirror image targeting the application wrapper operating on the target platform. In this solution, the application data restored from the repository is applied to a container started from the container mirror image. In this way, it is possible to conveniently and flexibly migrate applications on a source platform to multiple different types of target platforms based on containers that include application data and application wrappers.

The basic principles and several example embodiments of the present disclosure are described below with reference to FIGS. 1 to 5. It should be understood that these example embodiments are given only to enable those skilled in the art to better understand and thus implement the embodiments of the present disclosure, and are not intended to limit the scope of the present disclosure in any way.

Figure 1:
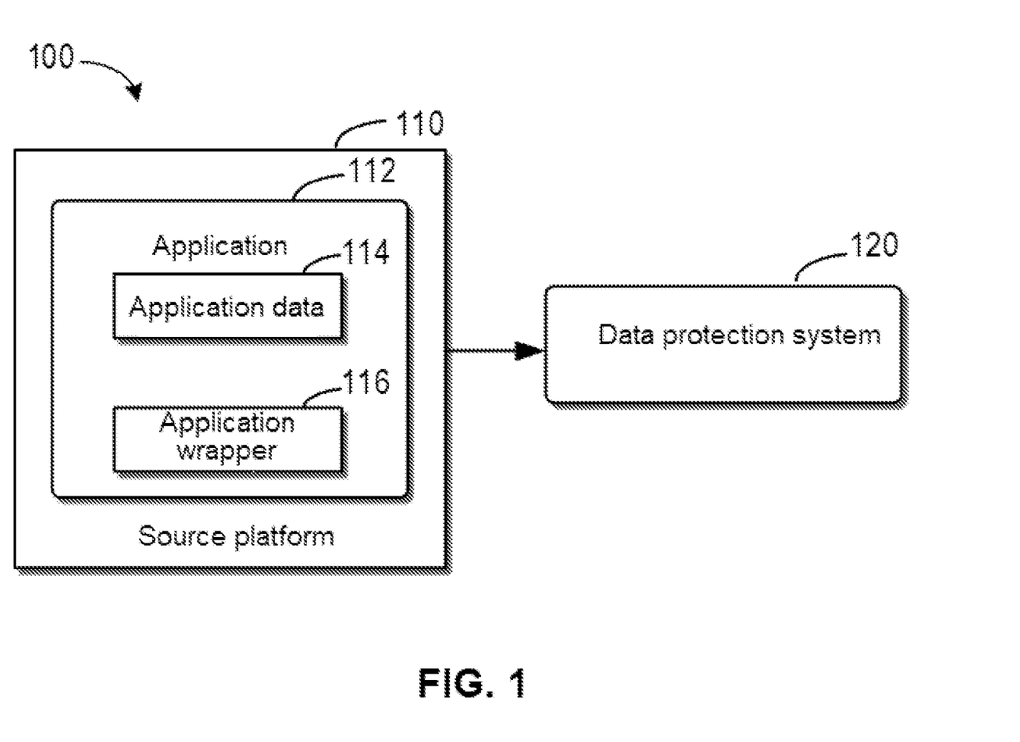
FIG. 1 illustrates a schematic diagram of an environment in which embodiments of the present disclosure can be implemented.

FIG. 1 illustrates environment 100 in which embodiments of the present disclosure can be implemented. As shown in FIG. 1, environment 100 includes source platform 110 and data management system 120. Application 112 to be backed up operates on source platform 110. Source platform 110 can be any operating system platform, such as MAC, Linux, or Microsoft operating systems. Source platform 110 can operate on a physical machine, a virtual machine, or a cloud. Application 112 can be an application designated by a user to be backed up, such as database application MySQL, Oracle, etc.

Application 112 may include application data 114 and underlying application wrapper 116. Application data 114 can be user data. For example, in the case where application 112 is database application MySQL, application data 114 can be the user data stored in the database. Application data 114 can be critical data that the user needs to back up. Application data 114 can be applied to different versions of application 112 operating on different platforms to support restoration of application 112 on multiple target platforms. Application wrapper 116 can be uniquely identified. For example, the name of application 112 can be used to identify application wrapper 116. Alternatively or additionally, the version number of application 112 can be used to identify application wrapper 116. For example, the name "MySQL" and the version number "8.0.22" can be used to uniquely identify application wrapper 116.

Data protection system 120 can be used to migrate application 112 operating on source platform 110 to a target platform. The target platform can be a user-specified platform. For example, data protection system 120 can migrate application MySQL operating on the user's local MAC operating system to an Ubuntu system in a public cloud. Data protection system 120 can be any suitable computing system with computing resources and storage resources. Embodiments of the present disclosure do not limit the specific form of the computing system, which may be, for example, a cloud, a server device, or a terminal device.

It should be understood that environment 100 shown in FIG. 1 is merely an example and should not constitute any limitation to the functions and scope of the implementations described in the present disclosure.

Figure 2:
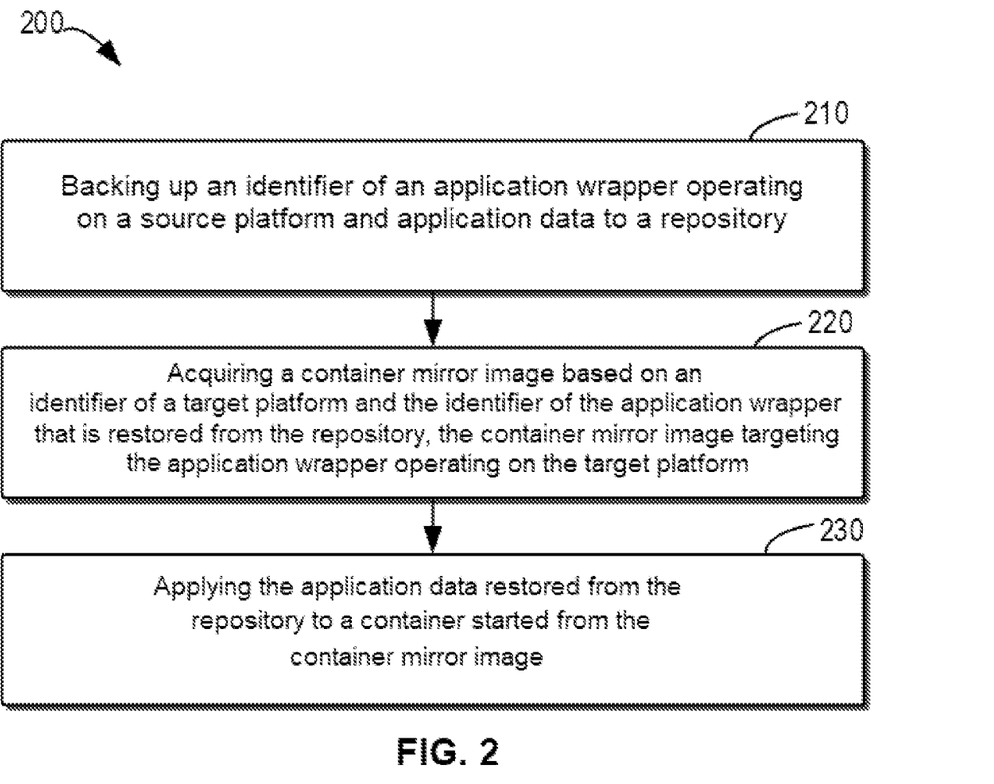
FIG. 2 illustrates a flow chart of an example method for data protection according to some embodiments of the present disclosure.

FIG. 2 illustrates a flow chart of example method 200 for data protection according to some embodiments of the present disclosure. Method 200 can be implemented, for example, in environment 100 as shown in FIG. 1. It should be understood that method 200 may also include additional actions not shown and/or may omit actions shown, and the scope of the present disclosure is not limited in this regard. Method 200 is described below with reference to FIGS. 1-4.

At block 210, an identifier of application wrapper 116 operating on source platform 110 and application data 114 are backed up to a repository. In some embodiments, the identifier of application wrapper 116 includes at least one of the name of the application and the version number of the application. The identifier of application wrapper 116 can also be other types of identifiers, such as a pre-set unique identification code. Details of backing up the identifier of application wrapper 116 operating on source platform 110 and application data 114 to the repository are described below with reference to FIG. 3.

Figure 3:
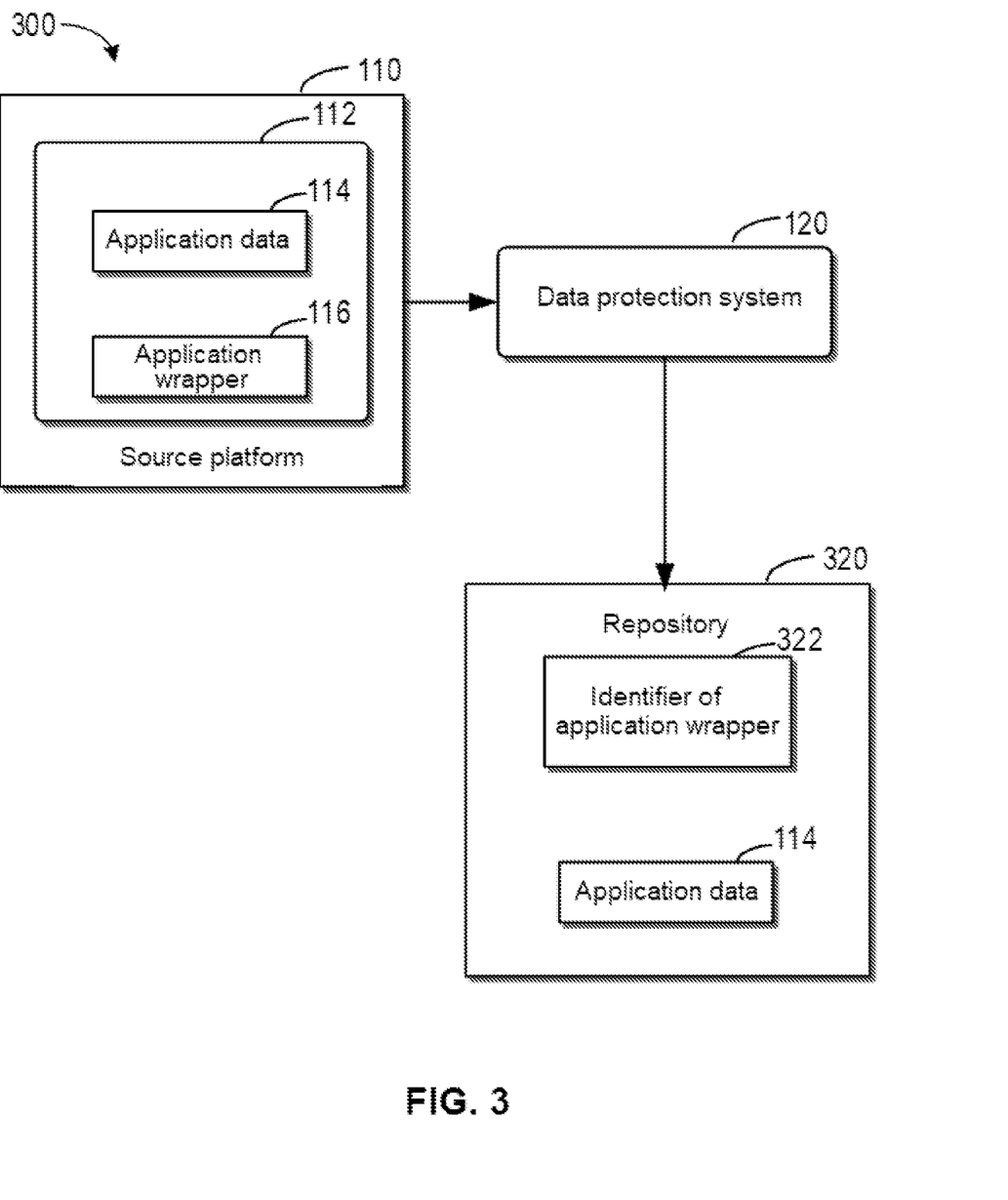
FIG. 3 illustrates a schematic diagram of a process for backing up an application according to some embodiments of the present disclosure.

FIG. 3 illustrates a schematic diagram of process 300 for backing up application 112 according to some embodiments of the present disclosure. As shown in FIG. 3, data protection system 120 can back up application data 112 and identifier 322 of the application wrapper to repository 320. Repository 320 can be a storage apparatus external to data protection system 120. Data protection system 120 can be communicatively connected to repository 320. In some embodiments, repository 320 can also be a storage apparatus within data protection system 120. For example, application data 114 and identifier 322 of the application wrapper can be stored directly in a memory within data protection system 120.

Compared with backing up snapshots or backing up the entire physical or virtual machine instance as described above, backing up application data 114 and identifier 322 of the application wrapper can reduce the amount of data that needs to be backed up, thereby improving the efficiency of the backup.

Figure 4:
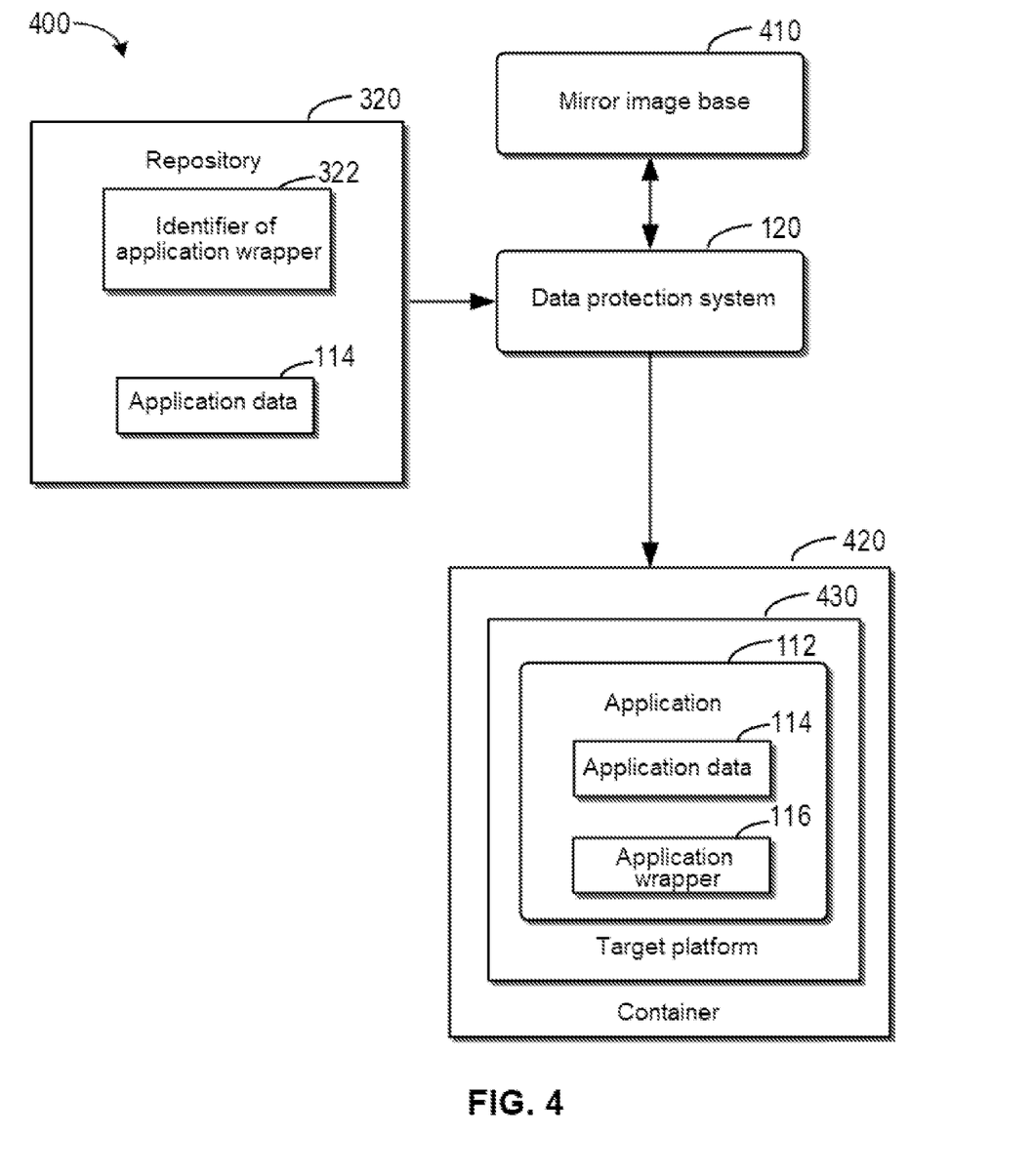
FIG. 4 illustrates a schematic diagram of a process for restoring an application according to some embodiments of the present disclosure.

Based on application data 114 and identifier 322 of the application wrapper that are backed up in repository 320, data protection system 120 restores application 112 to a target platform. Details of restoring application 112 to a target platform are described below with reference to FIG. 4. FIG. 4 illustrates a schematic diagram of process 400 for restoring application 112 according to some embodiments of the present disclosure. As shown in FIG. 4, data protection system 120 constructs container 420 based on application data 114 and identifier 322 of the application wrapper that are restored from repository 320. In container 420, application 112 operates on target platform 430 and includes restored application data 114.

Specifically and still referring to FIG. 2, at block 220, data protection system 120 acquires a container mirror image based on an identifier of target platform 430 and identifier 322 of the application wrapper that is restored from repository 320. The container mirror image targets application wrapper 116 operating on target platform 430. The identifier of target platform 430 can be used to uniquely identify target platform 430. The identifier of target platform 430 may include the name of target platform 430. Alternatively or additionally, the identifier of target platform 430 may include the version number of target platform 430. For example, the name "Windows" and the version number "10.0.21390.1" can be used to uniquely identify target platform 430. In some embodiments, target platform 430 can be specified by the user. In some embodiments, target platform 430 can be the same as source platform 110.

In some embodiments, data protection system 120 can receive the identifier of target platform 430 from the user and acquire the container mirror image from a mirror image base based on the identifier of target platform 430 and identifier 322 of the application wrapper. The identifier of target platform 430 and identifier 322 of the application wrapper can be used to uniquely identify the container mirror image. The mirror image base can store multiple container mirror images in advance to improve the efficiency of acquiring a container mirror image by data protection system 120. The mirror image base can be external to data protection system 120 and communicatively connected to data protection system 120. As shown in FIG. 4, data protection system 120 can request a container mirror image from external mirror image base 410. Alternatively or additionally, mirror image base 410 can also be stored in repository 320. Alternatively or additionally, mirror image base 410 can also be stored in data protection system 120.

In some embodiments, if it is determined that a container mirror image corresponding to the identifier of target platform 430 and identifier 322 of the application wrapper is missing from mirror image base 410, that container mirror image can be acquired via the Internet. For example, a container mirror image targeting application wrapper 116 operating on target platform 430 can be downloaded from the Docker Hub via the Web. In some embodiments, the acquired container mirror image can be stored to mirror image base 410 to update mirror image base 410.

In some embodiments, mirror image base 410 can also be periodically updated. For example, the latest container mirror image can be downloaded periodically via the Internet for use in improving the efficiency of data protection.

Based on the container mirror image, data protection system 120 starts container 420 to restore application 112 to target platform 430. Specifically and still referring to FIG. 2, at block 230, application data 114 restored from repository 320 is applied to container 420 started from the container mirror image. Data protection system 120 can start container 420 from the container mirror image acquired from mirror image base 410. As shown in FIG. 4, after started, container 420 can operate target platform 430, and application 112 can operate on target platform 430. Data protection system 120 can apply application data 114 that is restored from repository 320 to container 420 so that complete application 112 is restored to target platform 430.

In some embodiments, data protection system 120 can deploy container 420 to a physical machine, a virtual machine, or a cloud as needed. For example, container 420 can be deployed to the cloud service AWS or Azure. Alternatively or additionally, container 420 can be deployed to a server. Alternatively or additionally, container 420 can be deployed to a virtual machine.

With the above method 200, by decoupling application data and the infrastructure, it is possible to efficiently migrate applications on a source platform to multiple different types of target platforms flexibly by backing up only the application data and identifiers of application wrappers, thus improving the efficiency of data protection.

Figure 5:
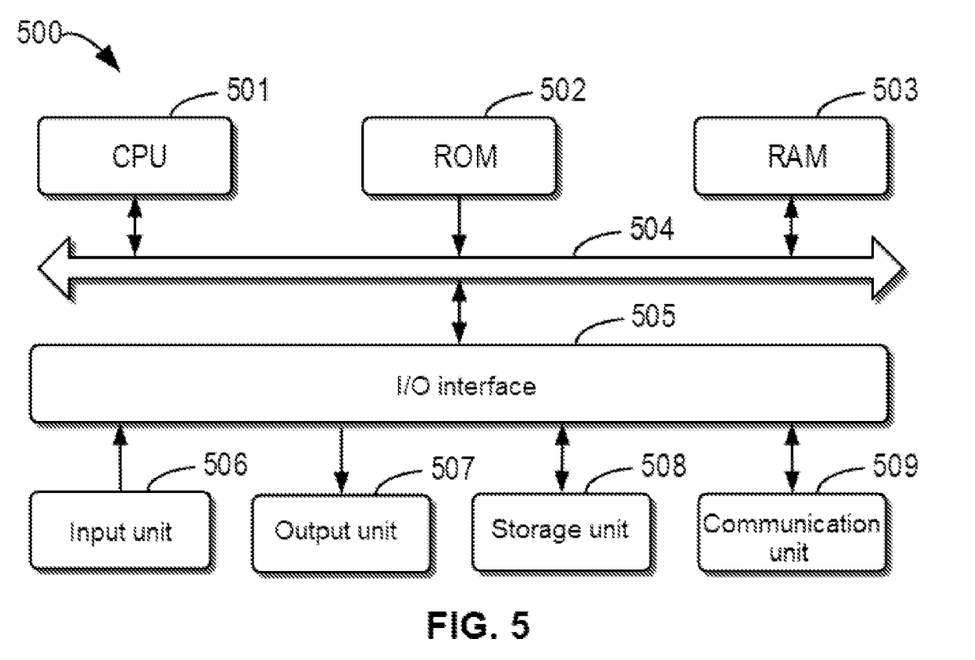
FIG. 5 illustrates a block diagram of an example computing device that can be used to implement embodiments of the present disclosure.

FIG. 5 illustrates a schematic block diagram of example device 500 that can be used to implement the embodiments of the present disclosure. For example, device 500 can be implemented in environment 100 as shown in FIG. 1. As shown in FIG. 5, device 500 includes central processing unit (CPU) 501 that may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by processing unit 501. For example, in some embodiments, method 200 may be implemented as a computer software program that is tangibly included in a machine-readable medium, such as storage unit 508. In some embodiments, part or all of the computer program may be loaded and/or installed to device 500 via ROM 502 and/or communication unit 509. When the computer program is loaded to RAM 503 and executed by CPU 501, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of the blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner, such that the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps are performed on the computer, the further programmable data processing apparatus, or the further device to produce a computer-implemented process, such that the instructions executed on the computer, the further programmable data processing apparatus, or the further device implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for data protection, including:
    backing up an identifier of an application wrapper operating on a source platform and application data to a repository;
    receiving an identifier of a target platform, the identifier of the target platform including at least one of a name and a version number of the target platform;
    acquiring a container mirror image from a mirror image base stored in the repository, the container mirror image acquired based on the identifier of the target platform and the identifier of the application wrapper that is restored from the repository, the container mirror image targeting the application wrapper operating on the target platform;
    applying the application data restored from the repository to a container started from the container mirror image; and
    updating, periodically, the mirror image base.

2. The method according to claim 1, wherein the identifier of the application wrapper includes at least one of the following:
    a name of an application; and
    a version number of the application.

3. The method according to claim 1, further including:
    determining the container mirror image is missing from the mirror image base;
    acquiring the container mirror image via the Internet in response to determination the container mirror image is missing from the mirror image base; and
    storing the container mirror image to the mirror image base.

4. The method according to claim 1, further including deploying the container to at least one of the following:
    a physical machine;
    a virtual machine; and
    a cloud.

5. An electronic device, including:
    a processor; and
    a memory coupled to the processor, the memory having instructions stored therein that, when executed by the processor, cause the processor to perform actions, the actions including:
    backing up an identifier of an application wrapper operating on a source platform and application data to a repository;
    receiving an identifier of a target platform, the identifier of the target platform including at least one of a name and a version number of the target platform;
    acquiring a container mirror image from a mirror image base stored in the repository, the container mirror image acquired based on the identifier of the target platform and the identifier of the application wrapper that is restored from the repository, the container mirror image targeting the application wrapper operating on the target platform;
    applying the application data restored from the repository to a container started from the container mirror image; and
    updating, periodically, the mirror image base.

6. The device according to claim 5, wherein the identifier of the application wrapper includes at least one of the following:
    a name of an application; and
    a version number of the application.

7. The device according to claim 5, wherein the actions further include:
    determining the container mirror image is missing from the mirror image base;
    acquiring the container mirror image via the Internet in response to determination the container mirror image is missing from the mirror image base; and
    storing the container mirror image to the mirror image base.

8. The device according to claim 5, wherein the actions further include deploying the container to at least one of the following:
    a physical machine;
    a virtual machine; and
    a cloud.

9. A non-transitory computer-readable medium having instructions stored therein, which when executed by a processor, cause the processor to perform actions, the actions comprising:
    backing up an identifier of an application wrapper operating on a source platform and application data to a repository;
    receiving an identifier of a target platform, the identifier of the target platform including at least one of a name and a version number of the target platform;
    acquiring a container mirror image from a mirror image base stored in the repository, the container mirror image acquired based on the identifier of the target platform and the identifier of the application wrapper that is restored from the repository, the container mirror image targeting the application wrapper operating on the target platform;
    applying the application data restored from the repository to a container started from the container mirror image; and
    updating, periodically, the mirror image base.

10. The computer-readable medium according to claim 9, wherein the identifier of the application wrapper includes at least one of the following:
    a name of an application; and
    a version number of the application.

11. The computer-readable medium according to claim 9, wherein the actions further include:
    determining the container mirror image is missing from the mirror image base;
    acquiring the container mirror image via the Internet in response to determination if it the container mirror image is missing from the mirror image base; and
    storing the container mirror image to the mirror image base.

12. The computer-readable medium according to claim 9, wherein the actions further include deploying the container to at least one of the following:
    a physical machine;
    a virtual machine; and
    a cloud.

* * * * *

UNITED STATES PATENT AND TRADEMARK OFFICE
CERTIFICATE OF CORRECTION

PATENT NO. : 11,782,802 B2
APPLICATION NO. : 17/386961
DATED : October 10, 2023
INVENTOR(S) : Chao Lin and Yuting Zhang Page 1 of 1

It is certified that error appears in the above-identified patent and that said Letters Patent is hereby corrected as shown below:

In the Claims

In Column 10, Claim 11, Line 53, delete "determination if it the container" and insert --determination the container--.

Signed and Sealed this
Twenty-ninth Day of April, 2025

Coke Morgan Stewart
*Acting Director of the United States Patent and Trademark Office*